United States Patent [19]
Helmes

[11] 4,077,449
[45] Mar. 7, 1978

[54] COPY MILLING MACHINE

[75] Inventor: Franciscus Jacobus Helmes, Tegelen, Netherlands

[73] Assignee: Helmes Machinefabriek B. V., Steyl, Tegelen, Netherlands

[21] Appl. No.: 714,137

[22] Filed: Aug. 13, 1976

[30] Foreign Application Priority Data

Aug. 29, 1975 Japan ................... 50-120310

[51] Int. Cl.² .......... B27C 5/00; B43L 13/00
[52] U.S. Cl. ............ 144/144 A; 33/23 F;
33/23 K; 33/174 G; 90/13.1; 144/116; 144/134 R; 144/144 R; 144/323
[58] Field of Search ........... 33/23 K, 23 F, 174 G; 90/13.2, 13.1; 144/144 R, 144 A, 137, 144.5, 116, 323, 134 R, 134 A, 134 C

[56] References Cited

U.S. PATENT DOCUMENTS

| 881,793 | 3/1908 | Green | 144/134 R |
|---|---|---|---|
| 2,851,071 | 9/1958 | Schils | 144/144 R |
| 3,165,976 | 1/1965 | Haspel | 144/144 R X |

FOREIGN PATENT DOCUMENTS

| 1,066,428 | 6/1954 | France | 144/144 R |
|---|---|---|---|
| 2,261,105 | 2/1974 | France | 144/144 R |
| 883,863 | 6/1953 | Germany | 144/144 R |

Primary Examiner—Othell M. Simpson
Assistant Examiner—W. D. Bray
Attorney, Agent, or Firm—Richards, Harris & Medlock

[57] ABSTRACT

A copy milling machine for producing a series of identically shaped wooden products, for instance parts of furniture, starting from mainly identical workpieces, said machine comprising a template, two swingably mounted and rotatably driven milling cutters and two sets of conveyor rollers for passing a template with two adjacent workpieces between both milling cutters, each cutter having two cutting portions mirror-symmetrically shaped with respect to a middle zone with the greatest diameter.

4 Claims, 4 Drawing Figures

COPY MILLING MACHINE

DISCUSSION OF THE PRIOR ART

The invention relates to a copy milling machine for manufacturing wooden products with a thickness $h$ the machine being provided with two opposite form cutters or milling cutters and two pairs of feed rollers on either side of the form cutters, between which an assembly of a template and workpiece is passed.

In this type of machine the workpiece is generally clamped on the template and carried past the form cutters. At most a single workpiece per passage through the machine becomes available and often a second passage past the form cutters is required in order to obtain a finished workpiece.

SUMMARY OF THE INVENTION

The invention aims to enhance the productivity of the known machines without complicating its operation. This is achieved by the combination of the following features:

- the template can accommodate on either side of its central area a workpiece of at least $2h$ in thickness;
- a cover plate bears on the workpieces said plate being mounted at its ends in a heightened part of the template;
- the milling cutters are provided with a double profile with the widest part in the central region, and
- the template has at the two ends of its profiled edges an outwardly directed side face, such that at the two ends of the passed workpieces a connective bridge of material is left.

Owing hereto a double template is used in which two double-thick workpieces are clamped so that one side of these workpieces is fully machined, whereupon the workpieces in the template are exchanged and passed a second time through the machine in such a manner that each workpiece of double thickness produces two ready made products which at their ends are interconnected by a material bridge. After having sawn off this bridge the two products from each workpiece become available.

A new and unmachined workpiece is positioned on one side of the template for passage through the machine. On the other side of the twin template is placed a workpiece which has already been machined on one side during a preceding passage. In this manner, each passage through the machine yields one half milled workpiece and one fully milled workpiece. The bridges at each end of the fully milled workpiece are then sawed off to separate the two completed products therefrom. The half milled workpiece, of course, is repositioned on the other side of the template for completion of the milling on the next successive passage through the machine.

Each time after having passed the assembly of the template and two workpieces, the operator only need perform the following three actions:

a. to remove the one double machined product;
b. to change the place of the other single machined piece in the template and,
c. to put another unmachined workpiece into the template before passing the assembly again through the machine.

Due to the presence of the central area in the template, the danger of both form cutters touching each other is avoided.

SURVEY OF THE DRAWINGS

FIG. 1 is a plan view of the machine;
FIGS. 2 and 3 show a vertical section on an enlarged scale along the lines II—II and III—III in FIG. 1; and
FIG. 4 shows how the material bridge is removed.

DESCRIPTION OF A PREFERRED EMBODIMENT

Figure 1:
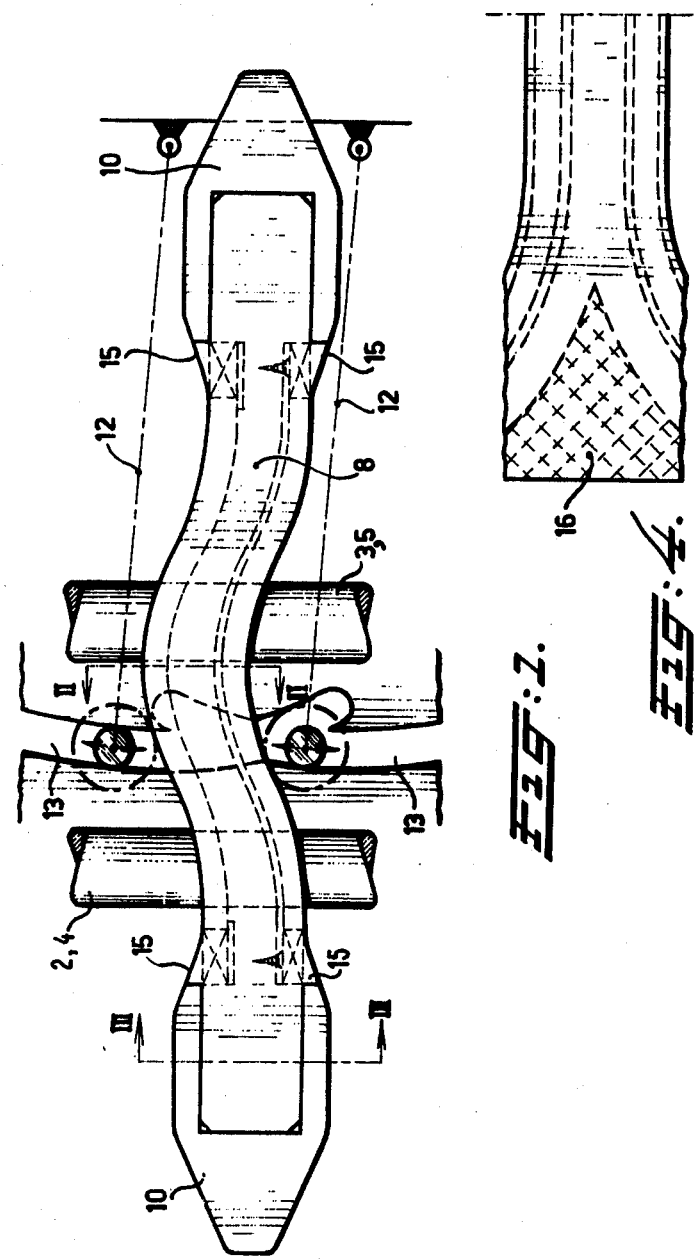

The copy milling machine consists of a frame (not shown) with a plate 1 in which two feed rollers 2 and 3 are countersunk. At some spacing over each of these rollers a second set of rollers 4 and 5 is provided so that two pairs of feed rollers 2+4 and 3+5 are available. An assembly 20 consisting of a lower template 6 of double width with a cover plate 7 is passed between these pairs of rollers.

In its central area the lower template 6 has a raised portion 8 executed so that the template can accommodate on either side a workpiece 9. The cover plate 7 is clear of the central area 8 of the lower template 6 and is mounted at both ends in raised end portions 10 of the lower template 6. The cover plate 7 is rigid and bears only on the two workpieces 9. On the upper side the cover plate 7 is slightly rounded in order to permit an efficient cooperation with the upper feed rollers 4 and 5 in case of small deviations.

On either side of the assembly 6-10 are two power driven milling cutters 11 their motor lying under the plate 1. Both tools are laterally movable by means of diagrammatically represented arms 12. Two overlapping slots 13 are provided in plate 1 in order to accommodate the driving shafts of the milling cutters 11. Each milling cutter 11 has a double profile with the widest part 14 in its centre.

It should finally be noted that the lower template 6 at the two ends of the profiled part has an outwardly directed side face 15, which is best shown in FIG. 1, so that at each end of the passed workpieces 9 a material bridge 16 (see FIG. 4) is left. Coaxial with each milling cutter 11 is a roller 17 which moves along the lower template 6 in order to direct the movement of the milling cutter 11.

During the passage of the assembly 20 through the machine each workpiece 9 will be double machined due to the double profile construction of each cutter 11. As is best shown on the lefthand side of FIG. 2, two partially milled products are obtained at each passage of a new workpiece 9 through the machine. Thus two final products are obtained at each repassage of a partially milled workpiece through the machine as is best seen on the right-hand side of FIG. 2. In use of the machine one proceeds as follows: first the assembly 20 with a single workpiece 9 is passed through the machine, e.g. on the left-hand side (see FIG. 2).

Thereupon the partially machined workpiece 9 is moved to the right-hand side while a new unmachined workpiece 9 is placed on the left-hand side, whereafter the assembly 20 is again passed through the machine.

Figure 2:
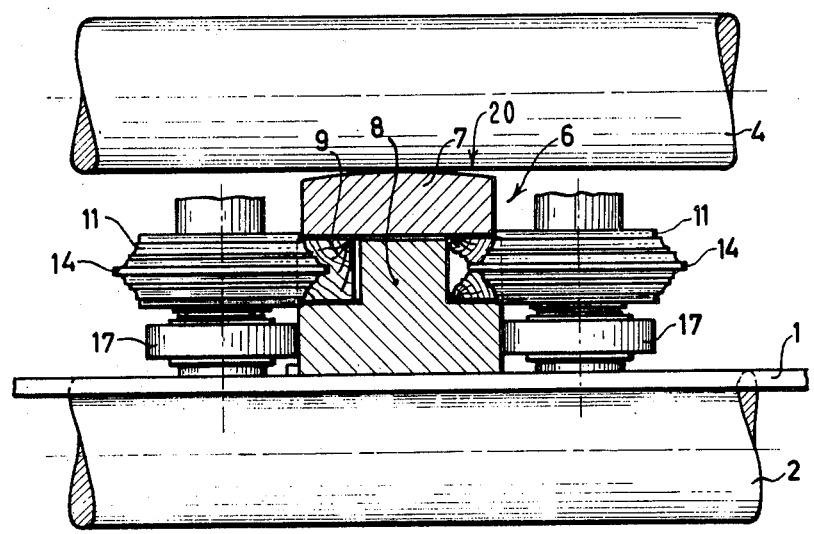
Figure 3:
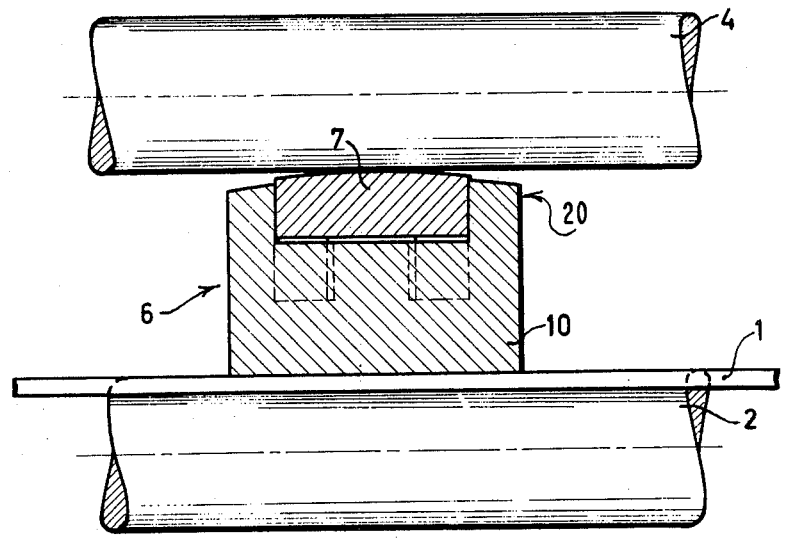

After this second passage the workpiece 9 on the right-hand side of FIG. 2 is completed and after having sawn off the two remaining material bridges 16 (see FIG. 4), two ready made final products are obtained. At every successive passage of the assembly 20 through the machine a new completely machined workpiece 9 is obtained from which two end products become available.

From the foregoing it is evident that the gist of the invention consists of the use of a sided template, as a consequence of which two workpieces 9 can be simultaneously machined, while in addition thereto the milling cutters 11 are in twin profile version, so that during each passage properly speaking two workpieces 9 comprising four products are simultaneously machined. After each passage of a partially machined workpiece a completely machined workpiece 9 becomes available which after cutting off the material bridge 16 produces two ready made final products.

What I claim is:

1. A copy milling machine for manufacturing products having a predetermined thickness comprising:
   a pair of opposed milling cutters each having double profile portions with the largest diameter of each milling cutter positioned between the profile portions thereof;
   said milling cutters being supported for movement toward and away from a central path extending therebetween;
   a pair of rollers each for controlling the positioning of one of the milling cutters relative to the central path;
   a template having opposed workpiece receiving zones each adapted to receive a workpiece having twice the predetermined product thickness;
   a cover plate for retaining workpieces in the workpiece receiving zones of the template;
   said template further including a pair of opposed profile edges for engaging the rollers and thereby controlling the positioning of the milling cutters relative to workpieces carried by the template;
   the profile edges of the template diverging outwardly at portions thereof corresponding to the ends of workpieces carried by the template so as to disengage the milling cutters from the workpieces and thereby provide material bridges joining the opposite ends of otherwise separated workpieces formed by the copy milling machine; and
   means for advancing the template, the cover plate and workpieces carried thereby along the predetermined path between the milling cutters.

2. The copy milling machine according to claim 1 wherein the template includes raised end portions for supporting the cover plate thereon.

3. For use in a copy milling machine for manufacturing products having a predetermined thickness, a template comprising:
   a template body having opposed profile edges extending along the lower portion thereof for engaging rollers and thereby controlling the positioning of opposed milling cutters;
   said template body defining opposed workpiece receiving zones above the profile edges each for receiving a workpiece having twice the predetermined product thickness;
   a cover plate for retaining workpieces in the workpiece receiving zones of the template;
   the profile edges of the template body diverging outwardly at portions thereof corresponding to the ends of workpieces carried by the template in the workpiece receiving and thereby provide material bridges joining the opposite ends of otherwise separated workpieces formed by the copy milling machine.

4. The template according to claim 3 wherein the template body includes raised end portions for supporting the cover plate thereon.

* * * * *